Aug. 14, 1934.   R. H. GODDARD   1,969,840
METHOD OF WELDING THIN METAL STRUCTURES
Filed June 22, 1933
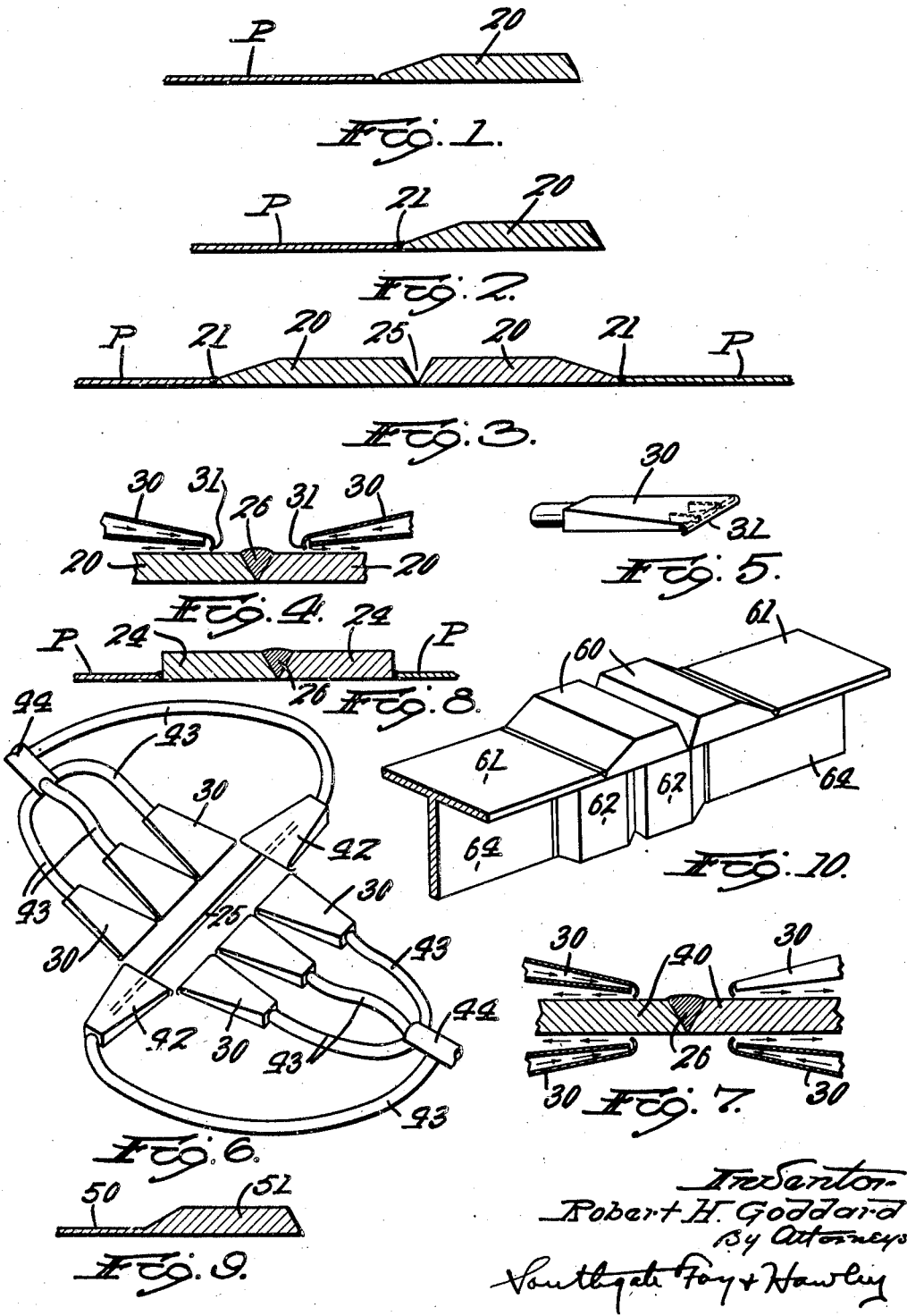

Patented Aug. 14, 1934

1,969,840

UNITED STATES PATENT OFFICE 1,969,840

METHOD OF WELDING THIN METAL STRUCTURES

Robert H. Goddard, Worcester, Mass.

Application June 22, 1933, Serial No. 677,020

10 Claims. (Cl. 113—112)

This invention relates to the fabrication of metal structures from sheets or other sections of relatively thin metal by welding together the edges of such sheets or sections.

While capable of somewhat general application, the invention relates particularly to the production of structures from relatively thin heat-treated metals, more commonly in the form of sheets or plates. Light weight tanks and cylinders are types of such structures.

It is well known in the art of metal working that the strength of many metals is greatly increased by submitting such metals to proper heat-treatment. In the case of thin sheets of certain metals, such as alloy steel, the strength of the heat-treated sheets or plates may be three or four times that of an untreated or annealed sheet of the same metal.

The great advantage of using such heat-treated and very strong sheets for the production of very thin and light-weight structures, such as fuel tanks for air-craft, is obvious, but it has heretofore been considered practically impossible to utilize the full value of such heat-treated sheets in welded structures. This was because the heat from the welding operation softened or annealed portions of the thin sheets adjacent the weld, destroying the effects of the heat-treatment thereof and leaving these portions with the much lower strength of the untreated metal.

It is the general object of my invention to provide an improved method of welding such thin sheets or other thin metal structures without annealing the thin metal itself or reducing its full heat-treated strength.

My invention further relates to apparatus by which my improved method may be conveniently practiced.

Preferred forms of my invention are illustrated in the drawing, in which

Fig. 1 is a sectional view showing parts assembled for the first step of my improved process;

Fig. 2 is a similar view showing the parts after a preliminary welding operation;

Fig. 3 shows a pair of the same parts assembled, preliminary to the final welding operation;

Fig. 4 shows a portion of the completed final weld, together with certain cooling devices shown in section;

Fig. 5 is a perspective view of one of the cooling devices;

Fig. 6 is a perspective view showing a plurality of the cooling devices in operative relation to the work;

Fig. 7 shows a modification of the cooling apparatus, partly in section;

Fig. 8 is a sectional view of a slightly modified construction of welded parts;

Fig. 9 is a sectional view showing a metal plate with an integral edge reenforcement, and Fig. 10 illustrates my invention as applied to the welding of T bars of thin cross section.

Referring to Figs. 1 to 4, I have illustrated my invention as utilized in securing together the edges of two thin metal plates P, which may be assumed to be of highly heat-treated steel and of relatively slight thickness.

The first step in carrying out my improved method is to assemble a reenforcing strip 20 in abutting relation with the edge of a plate P, as shown in Fig. 1, and to securely weld these parts together as indicated at 21 in Fig. 2.

The strips 20 are preferably of the same material as the plates P and are preferably of such thickness that the strength of the untreated or annealed strip 20 will be substantially equal to the strength of the heat-treated plate P. For instance, if the strength after heat-treatment is four times that before heat-treatment, the strip 20 should be four times as thick as the plate P. Preferably the abutting edge of the strip 20 is beveled off as indicated in Figs. 1 to 3, so that the edge adjacent the weld is substantially of the same thickness as the plate P.

It is not always necessary, however, that this beveled edge should be provided, as the parts may be assembled as indicated in Fig. 8 by welding the edge of the plate P to one edge portion of the strip 24 which is of full thickness. The construction shown in Figs. 1 to 3 is much preferred, however, as the welding of the parts may be much more advantageously performed.

After the strips 20 are welded to the plates P, it is obvious that the edges of the plates adjacent the welds 21 will have been softened or annealed. In the further carrying out of my invention, the plates P with the attached strips 20 are then again subjected to heat-treatment to restore the full heat-treated strength of the metal.

The outer edges of the strips 20 are preferably beveled so that when assembled they provide a V-shaped groove or recess 25 (Fig. 3) to receive metal 26 (Fig. 4) during the final welding operation.

In carrying out this final welding operation, I take steps to confine the heat of the final weld to the edge portions of the strips 20 adjacent the weld and to prevent this welding heat from spreading into the thinner portions of the strips 20 or into the plates P.

This confinement of the heat to the immediate proximity of the weld may be accomplished in different ways, but in the preferred manner of practicing my invention, I provide liquid cooling of the plates P and of the adjacent thin portions of the strips 20. This cooling liquid confines the welding heat to the immediate vicinity of the weld and to the relatively thick portions of the strips 20.

In order to supply this cooling liquid, I preferably provide nozzles 30 connected to a suitable supply of water or other liquid under pressure, said nozzles being made with relatively wide and thin delivery portions and each having an overhanging lip 31 (Fig. 4) by which the cooling water or other liquid will be directed away from the line of the weld.

The overhanging lip 31 is preferably maintained at a constant distance from the lower portion of the nozzle 30 by means of thin partitions 32 (Fig. 5).

By thus applying streams of cooling liquid closely adjacent the weld line but flowing away therefrom, the heat is rapidly conducted away from the thin outer edge portions of the strips 20, and neither these portions nor the adjacent parts of the plates P are softened or annealed during the welding operation. The only portions which are annealed are the edges of the strips 20 immediately adjacent the weld line, which portions, as previously stated, are made of such thickness that their strength in the unannealed state is substantially equal to the strength of the heat-treated parts P.

If strips 40 (Fig. 7) of unusual thickness are used, or if it is desired to remove heat with exceptional rapidity, the cooling liquid may be simultaneously applied to both sides of the strips.

I find it desirable to form the nozzles 20 in relatively narrow widths and to use any desired number of nozzles, as shown in Fig. 6, to build up a length of nozzle equal to that of the weld to be produced. Additional nozzles 42 may be provided at the ends of the weld, if it is desired to carry out the welding operation in a series of separate steps. These nozzles may be conveniently connected by branch pipes 43 to supply pipes 44.

While I have described my invention in connection with plates having built-up thickened edges, it may also be carried out with plates 50 (Fig. 9) having integral rolled and thickened edges 51.

My improved method may also be used in uniting structures of more complicated section, as indicated in Fig. 10, where strips 60 are welded to the ends of the top flanges 61 of a pair of T beams, and additional strips 62 are welded to one or both sides of the upright webs 64 thereof. The beams and strips are then heat-treated as previously described and the strips 60 and 62 are thereafter welded together. The welding heat is prevented from spreading into the thin sections by suitable cooling means such as a plurality of the liquid-applying nozzles 30.

Obviously the cooling of the metal adjacent the weld may be accomplished by means other than the liquid-applying nozzles, and in its broad aspects my invention is not to be regarded as limited to this particular method of cooling.

The invention above described enables me to effectively weld together thin heat-treated plates or other thin metal structures and to retain the full strength produced by previous heat-treatment thereof. I further accomplish this most desirable result without the necessity of heat-treating the completed articles which are frequently very bulky and difficult to handle effectively in a heat-treating operation.

Having thus described my invention and the advantages thereof, I do not wish to be limited to the details herein disclosed, otherwise than as set forth in the claims, but what I claim is:—

1. The method of fabricating thin metal structures which comprises providing thin metal elements with thickened edge portions, welding said edge portions together, and substantially preventing the transfer of welding heat to said thin metal elements.

2. The method of fabricating thin metal structures which comprises providing thin metal elements with thickened edge portions, welding said edge portions together, and preventing the transfer of sufficient heat to said thin metal elements to anneal the adjacent edge portions thereof.

3. The method of fabricating thin metal structures which comprises providing thin metal sheets, securing a reenforcing strip to an edge of each sheet, welding two such strips together in abutting relation, and confining the welding heat to portions of said strips spaced from said thin sheets.

4. The method of fabricating thin metal structures which comprises providing thin metal sheets, welding a reenforcing strip to an edge of each sheet, heat-treating each assembled sheet and strip, welding two such edge strips together after said heat-treatment, and substantially confining the welding heat to parts of said strips removed from said thin sheets.

5. The method of fabricating thin metal structures which comprises providing thin metal sheets, welding a reenforcing strip to an edge of each sheet, heat-treating each assembled sheet and strip, welding two such edge strips together after said heat-treatment, and applying a cooling liquid to said sheets and to portions of said strips adjacent to said sheets.

6. The method of fabricating thin metal structures which comprises providing thin metal sheets, welding a reenforcing strip to an edge of each sheet, heat-treating each assembled sheet and strip, welding two such edge strips together after said heat-treatment, and applying a cooling liquid to both sides of said sheets and to portions of said strips adjacent to said sheets.

7. The method of fabricating thin metal structures which comprises providing thin metal elements and reenforcing edge strips, said strips being of greater thickness than said thin elements but having edge portions abutting said elements and of substantially the same thickness, welding said strips to said thin elements, heat-treating the assembled strips and elements, welding the reenforcing strips of adjacent thin elements together, and cooling the thin edge portions of said strips and the adjacent portions of said thin elements during the welding operation.

8. The method of fabricating thin metal structures which comprises providing thin metal elements and reenforcing edge strips, said strips being of greater thickness than said thin elements but having edge portions abutting said elements and of substantially the same thickness, welding said strips to said thin elements, heat-treating the assembled strips and elements, welding the reenforcing strips of adjacent thin elements together, and applying streams of cooling liquid to the thin portions of said strips and to adjacent portions of said thin elements during the welding operation.

9. The method of fabricating thin metal structures which comprises providing thin metal elements and reenforcing edge strips, said strips being of greater thickness than said thin elements but having edge portions abutting said elements and of substantially the same thickness, welding said strips to said thin elements, heat-treating the assembled strips and elements, welding the reenforcing strips of adjacent thin elements together, and applying streams of cooling liquid to both sides of the thin portions of said strips and of adjacent portions of said thin elements during the welding operation.

10. The method of fabricating thin metal structures which comprises providing thin metal elements and reenforcing edge strips, said strips being of greater thickness than said thin elements but having edge portions abutting said elements and of substantially the same thickness, welding said strips to said thin elements, heat-treating the assembled strips and elements, welding the reenforcing strips of adjacent thin elements together, applying streams of cooling liquid to the thin portions of said strips and to adjacent portions of said thin elements during the welding operation, and causing said liquid to flow away from the welding area after engaging the metal to be cooled.

ROBERT H. GODDARD.